US006694332B2

United States Patent
Mansoori

(10) Patent No.: US 6,694,332 B2
(45) Date of Patent: Feb. 17, 2004

(54) METHOD AND SYSTEM FOR ELECTRONIC SEARCH WARRANTS

(75) Inventor: Edwin F. Mansoori, Canton, GA (US)

(73) Assignee: Palatine Systems Corporation, Norcross, GA (US)

( * ) Notice: Subject to any disclaimer, the term of this patent is extended or adjusted under 35 U.S.C. 154(b) by 299 days.

(21) Appl. No.: 09/966,659

(22) Filed: Sep. 28, 2001

(65) Prior Publication Data

US 2003/0065678 A1 Apr. 3, 2003

(51) Int. Cl.[7] .............................................. G06F 17/30
(52) U.S. Cl. .................................................... 707/104.1
(58) Field of Search ..................................... 707/104.1

(56) References Cited

U.S. PATENT DOCUMENTS

| | | | | |
|---|---|---|---|---|
| 4,353,886 A | * | 10/1982 | Lukens et al. | 424/1.65 |
| 5,377,185 A | * | 12/1994 | Bardusk | 370/341 |
| 6,400,996 B1 | * | 6/2002 | Hoffberg et al. | 700/83 |
| 6,601,040 B1 | * | 7/2003 | Kolls | 705/14 |
| 2002/0010679 A1 | * | 1/2002 | Felsher | 705/51 |
| 2002/0055924 A1 | * | 5/2002 | Liming | 707/100 |

OTHER PUBLICATIONS

Cunningham, Investigators Use a Variety of Methods to Obtain Relevant Documents, Journal of Health Care Compliance, vol. 2, No. 3, May/Jun. 2000.*

* cited by examiner

Primary Examiner—Wayne Amsbury
(74) Attorney, Agent, or Firm—Duane Morris LLP

(57) ABSTRACT

The present invention comprises a method and system for creation of a valid search warrant. In a preferred embodiment, the system allows generation of search warrants by appropriate personnel, at least one of whom is remotely located from a judge, and comprises a database, further comprising selectively retrievable audiovisual sessions and selectively retrievable data for a search warrant; a data communications network capable of providing audiovisual data in realtime; a mobile data entry device for entry of data pertinent to the search warrant, the data entry device located remotely from the judge, the data entry device operatively connected to the database via the data communications network; an audiovisual device operatively connected to the data communications network, the audiovisual device capable of capturing and reproducing audiovisual data in realtime; an approval device for accepting an approval of the search warrant from the judge; an electronic validation device for validating an identity of the relevant people; and an output device, located proximate the mobile data entry device, for producing a hard copy of the approved search warrant.

15 Claims, 2 Drawing Sheets

METHOD AND SYSTEM FOR ELECTRONIC SEARCH WARRANTS

BACKGROUND OF THE INVENTION

1. Field of the Invention

The present invention relates to preparation of search warrants. More specifically, the present invention relates to preparation of search warrants in realtime for generation at a location proximate the location to be searched.

2. Description of the Related Art

Systems have been proposed in the prior art to deal with arrest warrants and bookings. By way of example and not limitation, SAIC of San Diego, Calif. has marketed an automated on-line booking system. Federal Systems of Atlanta, Ga. has marketed an electronic warrant system ("EWI") that allowed a police officer to use a terminal at a detention center or precinct to generate arrest warrants. However, these prior art systems and methods are designed for arrest warrants and mainly consist of automated forms generation systems. Further, these systems did not allow invocation of the system from a site, remote from a judge or magistrate, that was proximate the subject of the warrant.

For example, the IRS has had search warrant software. See, e.g., the IRS Handbook 9.10, ADMINISTRATIVE DATABASES AND SOFTWARE, Chapter 3 CRIMINAL INVESTIGATION SUPPORT SOFTWARE, [9.10] 3.3.2 (Mar. 11, 1998), discussing a Search Warrant program used to set up information about a search/seizure site, to create an inventory record, to print labels for seized items, and to execute search warrants. The description may be found at http://www.irs.ustreas.gov/prod/bus_info/tax_pro/irm-part/part09/36427.html#ss11.

In general, search warrants differ from arrest warrants. Generally, in the United States a search warrant is not necessary if an arrest warrant is issued because searches can be made incidental to arrest (the so-called "Chimel Rule" and "Plain View Doctrine"). However, this only allows a search of the immediate area and obvious places where the stolen property might be located.

Although so-called "no-knock" warrants may be allowed under circumstances involving danger, destruction of evidence, and the possibility of escape, all other situations require a search warrant. However, the time lapse between determining a search is required and obtaining a warrant can lead to spoilation of evidence. Further, in some jurisdictions, search warrants must be executed and returned in a set, sometimes short, time frame.

In situations not involving immediate arrest, police departments therefore often use a search warrant. Search warrants must be obtained from the jurisdiction where the search will be conducted. Many jurisdictions have pre-printed forms depending upon the type of crime. Drug cases, for example, may list all controlled substances and associated paraphernalia. The officer or judge may simply cross out the items which are inapplicable. Systems of the prior art most often comprise automated generation of such standard forms. Some include an ability to capture at least a portion of the dynamic form data into a database.

Quite often, a search warrant needs to describe an offense prompting the search warrant as well as supporting facts and specifics for which the search will be conducted. In any event, search warrants are authorized by a judge or magistrate who look over the warrant including its supporting facts, e.g. a search warrant is valid only if the information on it is fresh.

Generally, prior art methods of generating an electronic search warrant require entry of data information pertinent to the warrant by a person using a data entry device located at a police station or courthouse. The prior art does not teach, motivate, or disclose use of realtime, bidirectional audiovisual linkages between a police office or other search warrant server located proximate an object of a search warrant and the judge or magistrate who will issue the search warrant. The prior art does not teach, motivate, or disclose generating the actual search warrant at a location remote from the judge or magistrate and proximate the search warrant server where the search warrant is electronically signed and verified.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENTS

In general, throughout this description, if an item is described as implemented in software, it can equally well be implemented as hardware.

The present invention comprises an automated search warrant system that gives a judge and law enforcement officers concurrent, hands-on access to the same search warrant document and data while conversing in realtime with each other via an audiovisual conferencing linkage. In a preferred embodiment, the present invention may allow police officers to generate a search warrant in as little as fifteen minutes while being located proximate the site to be searched, thus eliminating the cost of travel, the amount of paper flow and time constraints. As used herein, "judge" shall be construed to mean anyone with the authority to approve and/or issue search warrants and shall comprise judges and magistrates.

Figure 1:
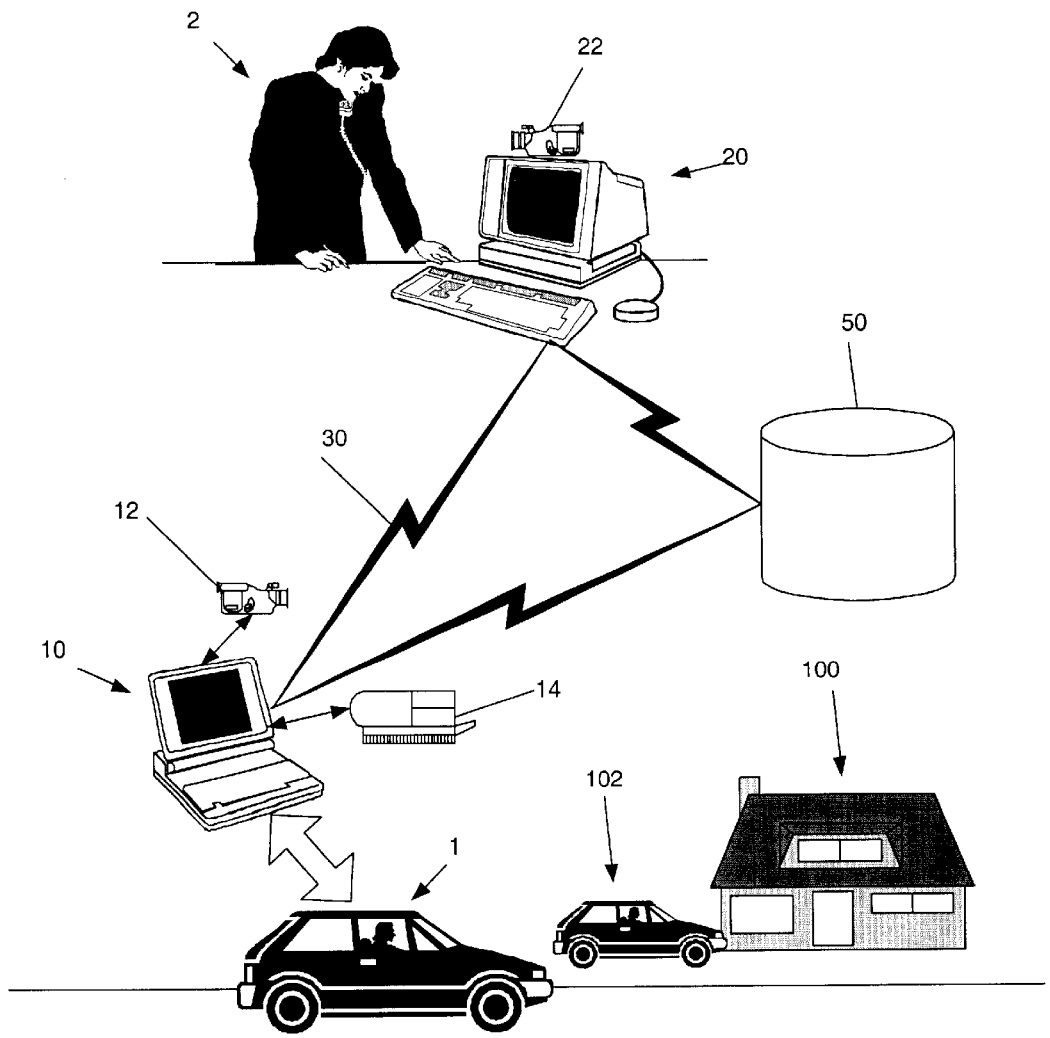
FIG. 1 is a schematic representation of an exemplary embodiment.

Referring to a schematic representation of an exemplary embodiment in FIG. 1, in an exemplary situation law enforcement officer 1 is proximate an area to be searched 100,102. Law enforcement officer 1 may be a police officer or anyone authorized by law to request and/or serve a search warrant and is remotely located from judge 2. Law enforcement officer 1 has access to a mobile data entry and commendations device, which, as shown in this exemplary embodiment by way of example and not limitation, comprises laptop computer 10 and camera 12. Similarly, judge 2 has a computer 20 or similar device as well as camera 22.

As will be understood by those of ordinary skill in the computer arts, laptop 10 and computer 20 may be of many varying and essentially equivalents brands and types, by way of example and not limitation comprising hand held devices such as personal digital assistants, laptop computers, computers integrated into a device such as a police car, or the like.

Cameras such as 12,22 may be built into laptop 10 and/or computer 20 or may be separate devices operatively connected to laptop 10 and/or computer 20. In a currently preferred embodiment, audiovisual devices such as camera 12 may be used to capture, show, or otherwise indicate one or more objects of the search warrant to judge 2 in realtime, by way of example and not limitation be focused on house 100, car 102, or the like in realtime for at least a portion of the audiovisual session between law enforcement officer 1 and judge 2.

Laptop 10 may be used as a data entry device for entry of information pertinent to the search warrant. Additionally, laptop 10 comprises a display device for reviewing the information once entered and may comprise display abilities for viewing judge 2 in realtime through audiovisual capabilities present in laptop 10.

Laptop 10 is operatively connected to computer 20 via a data communications network 30. Data communications network 30 may be wireless, as in the preferred embodiment, wired, or a combination thereof, and may comprise any of a number of protocols, by way of example and not limitation including point-to-point, broadcast, multipoint, packet switched, wide area networks, and the like, or combinations thereof. Data communications network 30 may further comprise secure and unsecured data networks including secure and unsecured Internet communications.

Software 40 (not shown in FIG. 1) operating at least in part at laptop 10 and computer 20 enables audiovisual and data capture as well as facilitates data entry and search warrant printouts.

Additionally, database 50 is operatively connected to laptop 10 and computer 20 via communications link 30. As will be familiar to those of ordinary skill in the art, database 50 may comprise a server and one or more hard disks arranged in numerous, equivalent manners, by way of example and not limitation including as a back-end SQL server, a general database server, an Internet based server, or the like or combinations thereof. Database 50 will further comprise selectively retrievable audiovisual recordings of the sessions established between law enforcement officer 1 and judge 2 when law enforcement officer 1 presents the search warrant request and its data to judge 2 and judge 2 agrees to and authorities or denies the search warrant issuance. In this manner, the captured audiovisual session is stored for later selective retrieval. In a preferred embodiment, the search warrant data, comprising reasons for the search as well as location 100,102 to be searched and items for which the search is authorized, will be captured as well for selective retrieval and may be associated with the captured audiovisual session.

Laptop 10 and computer 20 further comprise an approval device for accepting an approval of the search warrant from the judge or magistrate. In a preferred embodiment, the approval device is one or more software enabled approval sections on a selectable option set enabled at computer 20, by way of example and not limitation comprising electronic signature capabilities.

Laptop 10 and computer 20 further comprise an electronic validation device (not shown in FIG. 1) for validating an identity of the relevant people. The electronic validation device may comprise electronic signature and biometric devices.

Output device 14 is located with law enforcement officer 1 and allows producing a hard copy of the approved search warrant at remote location 100,102 where law enforcement officer 1 is at the time the search warrant is approved.

Figure 2:
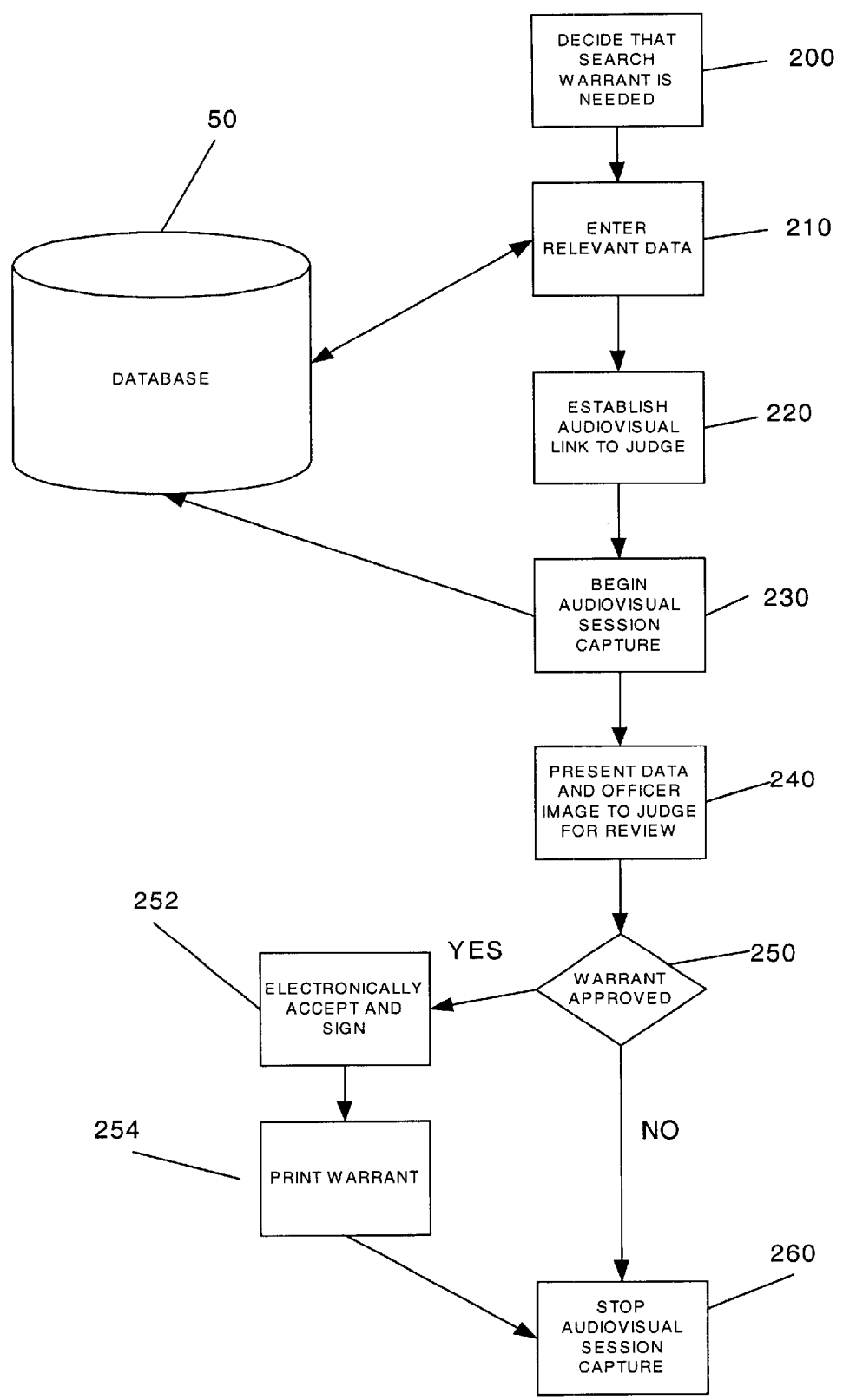
FIG. 2 is a flowchart of a method of an exemplary embodiment.

In the operation of an exemplary embodiment, referring now to a flowchart of an exemplary embodiment of the present invention in FIG. 2, law enforcement officer 1 decides that a search warrant of location 100 or 102 is justifiable 200. Law enforcement officer 1 enters data 210 pertinent to the search warrant desired at laptop 10 into database 50 where law enforcement officer 1 is authorized to enter the data and request the search warrant. Laptop 10 may be operatively connected to data communications network 30 at all times or may be connected on demand, such as manually by law enforcement officer 1, automatically by software 40 executing in laptop 10, or a combination thereof. Data communications network 30 may include secure and unsecure wireless networks, wired networks, combinations of wired and wireless networks, point-to-point networks, broadcast networks, multipoint networks, packet switched networks, wide area networks, and combinations thereof.

When all needed data are entered at laptop 10, an audiovisual link between judge 2 and law enforcement officer 1 may be initiated 220, such as on demand, manually by law enforcement officer 1, automatically by software 40 executing in laptop 10, or a combination thereof. Software 40 may additionally verify that all required data are present before initiating the audiovisual link, by way of example and not limitation such as by verifying that all required form fields are filled in with appropriate data. In addition, software 40 may validate the identity of law enforcement officer 1, such as by passwords, electronic signatures, and biometric devices, or the like, or combinations thereof.

Once an audiovisual communications link is established between law enforcement officer 1 and judge 2, capture of the audiovisual communications link session begins 230 and additional software 45 (not shown in the figures) presents the data relevant to the search warrant 240 to judge 2. Capture may be by any means as will be familiar to those of ordinary skill in the audiovisual arts. In the preferred embodiment, capture may be instituted automatically upon the receipt of some event such as a button region on a screen being accessed. In a preferred embodiment, audiovisual sessions may be digitized such as using an AVI format. It is also understood that software 40 and software 45 may be the same software application, different modules of an overall integrated software application, or separate software applications.

Judge 2 reviews the data. Additionally, judge 2 may speak directly with law enforcement officer 1 to gain more insight into the search warrant request, including requesting and being shown search location 100,102 in realtime such as by using camera 12.

Judge 2 then accepts or denies the request for a search warrant 250. If a search warrant is approved, all parties required by law applicable to that search warrant electronically note their acceptance and electronically sign the search warrant 252. When the search warrant has been accepted and signed, the audiovisual session may terminated 260, either manually or automatically such as by software 40 or 45, and stored for later, selective retrievable in database 50.

Further, when the search warrant has been accepted and signed, a hard copy of all forms required to complete the search warrant may be printed 254 where needed such as at output device 14 located proximate law enforcement officer 1.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A device for generation of search warrants by appropriate personnel, at least one of whom is remotely located from a judge, comprising:

a. a database, further comprising selectively retrievable audiovisual sessions and selectively retrievable data for a search warrant;
b. a data communications network capable of providing audiovisual data in realtime;
c. a mobile data entry device for entry of data pertinent to the search warrant, the data entry device located remotely from the judge, the data entry device operatively connected to the database via the data communications network;
d. an audiovisual device operatively connected to the data communications network, the audiovisual device capable of capturing and reproducing audiovisual data in realtime;
e. an approval device for accepting an approval of the search warrant from the judge;
f. an electronic validation device for validating an identity of the relevant people; and
g. an output device, located proximate the mobile data entry device, for producing a hard copy of the approved search warrant.

2. The system of claim 1 wherein the data entry device comprises laptop computers, specialized computers, and personal digital assistants.

3. The system of claim 1 wherein the data communications network of element (b) is selected from the group of data communications networks consisting of wireless networks, wired networks, combinations of wired and wireless networks, point-to-point networks, broadcast networks, multipoint networks, packet switched networks, wide area networks, and combinations thereof.

4. The system of claim 1 wherein the audiovisual device comprises digital cameras located externally from the data entry device, microphones located externally from the data entry device, digital cameras integrated into the data entry device, and microphones integrated into the data entry device.

5. The system of claim 1 wherein the approval device comprises a computer and an audiovisual device.

6. The system of claim 1 wherein the electronic validation device comprises electronic signature and biometric devices.

7. The system of claim 1 wherein:
a. the remotely located personnel comprise police officers; and
b. the relevant people further comprise
   i. police officers; and
   ii. judges and magistrates who may approve the request for the search warrant.

8. The system of claim 1 wherein the audiovisual capture device of element (d) captures data from the group of audiovisual data consisting of audiovisual sessions between the person requesting the warrant and the judge in realtime and one or more selectively focused scenes comprising a subject of the search warrant.

9. The system of claim 1 wherein the captured audiovisual data are stored for later selective retrieval.

10. The system of claim 1 wherein the data entry device is operatively connected to the database by a wide area network comprising secure and unsecured wide area networks.

11. A method of generating an electronic search warrant, comprising:
a. entering data relevant to a search warrant into a search warrant request by a person who is authorized to enter the data and request the search warrant, the person using a mobile data entry device operatively connected to a data communications network, the person located remotely from a judge;
b. establishing an audiovisual link session between the judge and the person;
c. capturing the audiovisual link session in realtime;
d. presenting the data to the judge by the person;
e. reviewing the data by the judge;
f. accepting or denying the person's request for a search warrant by the judge;
g. if a warrant is approved,
   i. electronically accepting the search warrant by all parties required by law applicable to that search warrant;
   ii. electronically signing the search warrant by all parties required by law applicable to that search warrant; and
   iii. issuing a hard copy of all forms required to complete the search warrant at a location proximate the mobile data entry device.

12. The method of claim 11, further comprising storing the captured audiovisual session data in a database for later selective retrieval.

13. The method of claim 11, further comprising storing the data relevant to the search warrant in a database for later selective retrieval.

14. The method of claim 11, wherein step (f) further comprises:
i. storing the captured audiovisual session data in a database for selective retrieval;
ii. storing the data relevant to the search warrant in a database for selective retrieval; and
iii. associating the stored captured audiovisual session data with the stored data relevant to the search warrant.

15. The method of claim 11, further comprising using the audiovisual device to indicate an object of the search warrant to the judge in realtime.

* * * * *